(12) United States Patent
Reinders

(10) Patent No.: US 7,861,549 B2
(45) Date of Patent: Jan. 4, 2011

(54) DEWPOINT COOLER

(75) Inventor: Johannes Antonius Maria Reinders, Warnsveld (NL)

(73) Assignee: Oxycom Beheer B.V., Raalte (NL)

( * ) Notice: Subject to any disclaimer, the term of this patent is extended or adjusted under 35 U.S.C. 154(b) by 0 days.

(21) Appl. No.: 12/144,767

(22) Filed: Jun. 24, 2008

(65) Prior Publication Data

US 2009/0007584 A1    Jan. 8, 2009

Related U.S. Application Data

(63) Continuation of application No. 10/512,483, filed on Jul. 28, 2006, now Pat. No. 7,415,837.

(30) Foreign Application Priority Data

| Apr. 26, 2002 | (NL) | ................................. 1020482 |
| Jul. 2, 2002 | (NL) | ................................. 1020976 |
| Nov. 1, 2002 | (NL) | ................................. 1021812 |

(51) Int. Cl.
*F28D 5/00* (2006.01)
(52) U.S. Cl. ............................................... 62/310
(58) Field of Classification Search ................. 62/304, 62/310, 335; 165/110, 133, 181
See application file for complete search history.

(56) References Cited

U.S. PATENT DOCUMENTS

| 2,174,060 | A |   | 9/1939 | Niehart |         |
|-----------|---|---|--------|---------|---------|
| 4,002,040 | A | * | 1/1977 | Munters et al. ............... | 62/121 |
| 4,023,949 | A |   | 5/1977 | Becwar et al. | |
| 4,040,804 | A |   | 8/1977 | Harrison | |
| 4,350,570 | A |   | 9/1982 | Maisotsenko et al. | |
| 4,674,295 | A |   | 6/1987 | Curtis, Sr. | |
| 4,842,052 | A |   | 6/1989 | Gershuni et al. | |
| 4,873,835 | A |   | 10/1989 | Rojey et al. | |
| 4,971,245 | A |   | 11/1990 | Maisotsenko et al. | |
| 4,976,113 | A |   | 12/1990 | Gershuni et al. | |
| 4,977,753 | A |   | 12/1990 | Maisotsenko et al. | |
| 5,009,263 | A |   | 4/1991 | Seshimo et al. | |
| 5,187,946 | A | * | 2/1993 | Rotenberg et al. ............ | 62/314 |
| 5,212,956 | A |   | 5/1993 | Tsimerman | |
| 5,301,518 | A |   | 4/1994 | Morozov et al. | |
| 5,315,843 | A |   | 5/1994 | Morozov et al. | |

(Continued)

FOREIGN PATENT DOCUMENTS

BE    1013160    10/2001

(Continued)

*Primary Examiner*—Melvin Jones
(74) *Attorney, Agent, or Firm*—David P. Owen; Coraline J. Haitjema; Howrey LLP

(57) ABSTRACT

A dewpoint cooler comprises: two medium circuits coupled mutually via a heat-conducting wall, through which circuits two media can flow, wherein the second medium contains gas, which wall has heat-conducting protrusions; wherein the wall and the protrusions are covered with a hydrophilic coating which can absorb an evaporable liquid and relinquish it again through evaporation such that the wetted coating, and thereby also the heath-conducting surfaces and the protrusions, are cooled; a wetting unit for subjecting the secondary medium to wetting by the evaporable liquid by evaporating liquid from the coating such that the evaporated liquid entrained by the secondary medium extracts heat from the primary medium via the heath-conducting wall. The coating consists of a porous technical ceramic material, such as a mineral wool.

20 Claims, 3 Drawing Sheets

U.S. PATENT DOCUMENTS

| | | | |
|---|---|---|---|
| 5,349,829 A * | 9/1994 | Tsimerman | 62/314 |
| 5,453,223 A | 9/1995 | Maisotsenko | |
| 5,718,848 A * | 2/1998 | James | 261/128 |
| 5,800,595 A | 9/1998 | Wright | |
| 5,860,284 A | 1/1999 | Belding et al. | |
| 6,235,219 B1 | 5/2001 | Beckenhauer | |
| 6,338,258 B1 | 1/2002 | Lee et al. | |
| 6,497,107 B2 | 12/2002 | Maisotsenko et al. | |
| 6,581,402 B2 | 6/2003 | Maisotsenko et al. | |
| 7,644,983 B2 * | 1/2010 | Wolfe et al. | 297/180.15 |
| 2002/0038552 A1 | 4/2002 | Maisotsenko et al. | |
| 2002/0073718 A1 | 6/2002 | Maisotsenko et al. | |
| 2003/0033821 A1 | 2/2003 | Maisotsenko et al. | |
| 2003/0126876 A1 | 7/2003 | Maisotsenko et al. | |
| 2003/0145609 A1 | 8/2003 | Maisotsenko et al. | |

FOREIGN PATENT DOCUMENTS

| | | | |
|---|---|---|---|
| EP | 0281631 | | 9/1988 |
| EP | 1081440 | A2 | 3/2001 |
| GB | 2160963 | A | 1/1986 |
| JP | 50049752 | U1 | 5/1975 |
| JP | 61011580 | A | 1/1986 |
| JP | 61259095 | A | 11/1986 |
| JP | 62087797 | A | 4/1987 |
| JP | 63319020 | | 6/1987 |
| JP | 05149687 | A | 6/1993 |
| JP | 8159958 | | 6/1996 |
| JP | 11083369 | A | 3/1999 |
| JP | 62252890 | A | 11/2000 |
| JP | 2000317248 | A | 11/2000 |
| NL | 7711149 | | 4/1979 |
| WO | 8701180 | A1 | 2/1987 |
| WO | 9735152 | A1 | 9/1997 |
| WO | 9941552 | A1 | 8/1999 |
| WO | 0227254 | A | 4/2002 |
| WO | 03091633 | A1 | 11/2003 |

* cited by examiner

DEWPOINT COOLER

CROSS REFERENCE TO RELATED APPLICATIONS

This application is a continuation of U.S. application Ser. No. 10/512,483 which claims priority from Netherlands application number NL1020482 filed on 26 Apr. 2002; Netherlands application number NL1020976 filed on 2 Jul. 2002; and Netherlands application number NL1021812 filed on 1 Nov. 2002. The contents of all of these applications are hereby incorporated by reference in their entirety.

BACKGROUND OF THE INVENTION

Field of the Invention

The invention relates to a cooling device and in particular to a dewpoint cooler.

BRIEF SUMMARY OF THE INVENTION

The invention provides a dewpoint cooler, comprising:

a first medium circuit and a second medium circuit thermally coupled thereto via an at least partially heat-conducting wall, through which two circuits two respective media can flow in counterflow, wherein at least the second medium contains a gas, for instance air, with a relative humidity of less than 100%;

which heat-conducting wall has break-up means for breaking up at least the thermal boundary layer, the laminar boundary layer and the relative humidity boundary layer at the position of at least active zones for heat transfer in at least the primary medium, which break-up means comprise heat-conducting protrusions which enlarge the effective heat-conducting surface area of said wall;

wherein the heat-conducting surfaces of said wall and the break-up means are at least partially covered at least in the area of the secondary medium with a hydrophilic, for instance hygroscopic coating, which coating is for instance porous and/or can absorb an evaporable liquid, for instance water, by capillary action, retain it and relinquish it again through evaporation, such that the wetted coating, and thereby also the heat-conducting surfaces and the break-up means, are cooled;

primary drive means based on pressure difference, for instance a fan or pump, for the primary medium;

secondary drive means based on pressure difference, for instance a fan, for the secondary medium; and a wetting unit for subjecting the secondary medium to wetting by the evaporable liquid by evaporating liquid from the coating such that the evaporated liquid entrained by the secondary medium extracts heat from the primary medium via the heat-conducting wall; wherein the coating consists of a porous technical ceramic material, for instance a burnt layer, a cement such as a Portland cement, or a fibrous material, for instance a mineral wool such as rockwool, and wherein the coefficient of heat transfer of the whole wall amounts to a minimum of 1 W/m2K.

Very good results have been obtained particularly with Portland cement. The layer can consist of this cement of microporous type, wherein the layer thickness lies for instance in the order of magnitude of 50 µm.

It is known that a liquid can be cooled to a greater or lesser extent in very primitive manner, for instance in a warm sunny environment, by enveloping the liquid in a container with a moist cloth. Because the water in the cloth evaporates due to the heat and possible wind, there occurs an evaporation which is accompanied by a temperature drop in the wall of the container, which is transmitted to the liquid present therein. The per se known "dewpoint cooling" is based on this generally known basic principle.

A dewpoint cooler is a specific type of enthalpy—exchanger. As is known, enthalpy is defined as the sum of the internal energy and the product of pressure and volume in a thermodynamic system. It is an energy-like property or status function and has the dimension of energy. The value is determined solely by temperature, pressure and composition in the system.

According to the law of conservation of energy, the change in the internal energy is equal to the heat which is transferred to the system minus the work done by the system. If for instance the only work carried out is a volume change at constant pressure, the change in enthalpy is exactly equal to the energy supplied to the system.

In respect of dewpoint cooling the heat of evaporation of water is an essential aspect. When water is boiled energy is supplied to the water, but the temperature cannot rise above boiling point. The work performed on the system is employed in this case to cause the water to be turned into water vapour. This process is designated as evaporation and in this case takes place isothermally. It is essential that a phase change occurs from the liquid phase to the vapour or gas phase.

The reverse process, wherein gas or vapour becomes more dense to form liquid, is referred to as condensation. Condensation can for instance occur in moist air, i.e. water evaporating air, in the case where the air in question comes into contact with such a cold surface that the relative humidity at that location rises to the saturation value associated with the relevant temperature. In that case the air is no longer able to absorb the quantity of water present, whereby the water at that location changes from the gas or vapour phase to the liquid phase.

Compared to this known technique, the dewpoint cooler according to the invention is superior in the sense that its performance is substantially improved by the various stated characterizing aspects. Important is the use of said surface-enlarging break-up means, which make a substantial contribution toward the heat transfer between the heat-conducting wall and the respective flow-by media. The characteristic quantity here is the so-called Nusselt number, which is a measure for this heat transfer and can reach very high values according to the invention.

It is important to draw attention to the fact that the surface-enlarging break-up means increase considerably the temperature working range of the dewpoint cooler. In practical conditions and with a well designed dewpoint cooler according to the invention it is for instance possible to operate with an input temperature, i.e. the infeed temperature of the primary medium, of for instance 800 C.

It is further of importance that the heat-conducting surfaces and the break-up means are covered in the indicated manner with a hydrophilic coating, which is moreover capable of buffering a sufficiently large quantity of water, which water is for instance supplied intermittently by said wetting unit.

It is pointed out with emphasis that the wetting unit must be embodied such that no or at least negligible atomization occurs, but that there must be for instance an intermittent liquid flow which directly keeps the hydrophilic coating wet. Only in this way is the operation as dewpoint cooler with high efficiency ensured, otherwise than for instance the case where a heat-conducting wall without coating or with a thin coating is sprayed with an atomized liquid. In this case evaporation already occurs in the relevant medium flow, whereby this flow does indeed cool, but the heat transfer to the wall, through the wall and subsequently to the medium at the other side of the wall, will be very limited.

According to an aspect of the invention the dewpoint cooler has the special feature that the coating consists of a plastic. In this embodiment too the plastic can be of a porous type. The porosity can for instance be obtained by shrinkage during cooling or curing. Use can also be made of a gel, which may for instance have a hygroscopic character, can thus absorb water and relinquish it to an airflow flowing past.

The above described embodiments can advantageously have the special feature that the effective outer surface area of the coating, from which the liquid can evaporate, is at least 100×, preferably at least 1000×, larger than the projected surface area thereof. It should be understood that the outer surface of a coating can for instance have an irregular shape, comparable for instance to the coastline of Brittany. In this case it is possible to achieve on micro-scale that the effective surface area is extremely larger than the projected surface area, and that a very effective breaking-up of said boundary layers can take place locally due to turbulence and other air movements.

A preferred embodiment has the special feature that the dewpoint cooler is dimensioned in such a way and the medium flows have values such that in the secondary flow the dewpoint is approached within 10 C. The dimensioning in question can be realized on the basis of the above stated specifications according to the invention by designing the dewpoint cooler on the basis of knowledge in depth.

According to yet another aspect of the invention, the dewpoint cooler can have the special feature that the break-up means comprise fins, which fins are embodied as a number of strips, each having a general wave shape, successive wave tops of each of these strips being coupled on the one side to the wall, and that the coating is substantially arranged only on the surface of each strip which is remote from the wall. Such fins without coating are per se known, for instance from car radiators. They are very effective and, in the context of the dewpoint cooler according to the invention, they produce a surprisingly high efficiency in combination with a carefully chosen hydrophilic coating, in particular a coating consisting of micro-porous Portland cement.

As already stated above, on the basis of the available knowledge relating to heat-exchangers the dewpoint cooler according to the invention can be designed with care on the basis of the principles of the present invention, such that a high efficiency is realized. In this respect a variant is important in which use is made of said aspect relating to substantially enlarging the effective outer surface area of the coating, wherein the properties of the coating and those of the liquid are also chosen in relation to each other such that (a) per surface area unit of the wall and the break-up means a predetermined quantity of liquid can be buffered in the coating; and (b) the thermal resistance of a coating filled with liquid is negligible transversely of its main plane relative to the total thermal resistance in the path between the heat-conducting wall and the flow-by secondary medium.

Use can be made of an optionally adjustable reversing unit to reverse a part of the primary medium flow at the outlet of the first medium circuit in order to form the secondary medium flow. In this case there is a gross primary medium flow, a net primary medium flow, which in cooled state is delivered as effective flow, and a tare branch flow which, via the evaporation of liquid in the branched medium acting as secondary medium, exerts a cooling effect on the gross primary medium flow. The tare secondary flow heated by the gross primary flow is discharged as loss into the environment, in particular to the outside environment. The secondary flow can have a value for instance in the order of 30% of the gross primary flow.

As the ratio between said gross flow and the tare flow can substantially affect the efficiency of the dewpoint cooler, an embodiment can have the special feature that the ratio between the primary flow and said part of the primary flow is adjustable such that the efficiency of the dewpoint cooler is adjustable.

In a particular embodiment incorporating this latter aspect, the dewpoint cooler according to the invention has the special feature that the adjusting means are embodied as an optionally adjustable through—feed in the primary circuit and an adjustable through—feed in the secondary circuit. Like any through-flow circuit, the primary circuit has a certain flow resistance. This means that, in the case a secondary circuit is branched off, a certain flow will take place therethrough which depends on the flow resistance in the upstream and the downstream primary circuit and that in the secondary circuit. For instance in the case where the primary circuit is not variable, by choosing the flow resistance in the secondary circuit the ratio between the relevant flow rates can be adjusted in order to adjust the efficiency of the dewpoint cooler. It is also possible to apply a valve with adjustable through—feed in both the upstream primary circuit and the secondary circuit.

In order to enhance the heat transfer as much as possible, the protrusions in the flow direction must interfere as little as possible with each other, in the sense that each protrusion, such as a fin, co-acts with an almost undisturbed flow. In this respect use can advantageously be made of an embodiment in which the protrusions have mutually offset relationships.

In the case of a substantial thermal conduction in longitudinal direction, i.e. in the direction of the medium flows, which flow in mutually opposing directions to achieve an optimum efficiency, the dewpoint cooler according to the invention can advantageously have the special feature that the protrusions have a limited length in the flow direction which enhances the heat transfer.

The dewpoint cooler can also have the feature that the protrusions are separated in flow direction by parts with a substantially smaller thermal conduction.

In order to obtain the sought-after high efficiency it is necessary in the dewpoint cooler according to the invention to ensure a good wetting of the coating, which can consist of separate parts, wherein particularly no dry surface parts may remain. This is because a temperature difference could hereby occur locally, which would cause undesired heat flows resulting in the performance of the cooler leaving something to be desired. The ratios between the surface areas of the heat-conducting surfaces and the break-up means in the primary and the secondary circuit must further be chosen such that, given all preconditions, the heat flows between the primary and the secondary medium are as large as possible.

The invention provides the option of constructing a dewpoint cooler with a greatly increased efficiency, wherein the temperature at the outlet of the primary circuit in the so-called h, x-diagram according to Mollier reaches at least the line of 85% RH (relative humidity) and wherein a greatly reduced temperature difference results between the primary inlet and the secondary outlet, i.e. 2 to 3C. It is noted that it is desirable that the saturation line (100% RH) is approached as closely as possible, wherein in practice a value of approximately 85% is aimed for.

BRIEF DESCRIPTION OF THE DRAWINGS

The invention will now be elucidated on the basis of the annexed figures. Herein.

DESCRIPTION OF ILLUSTRATIVE EMBODIMENTS

Figure 1:
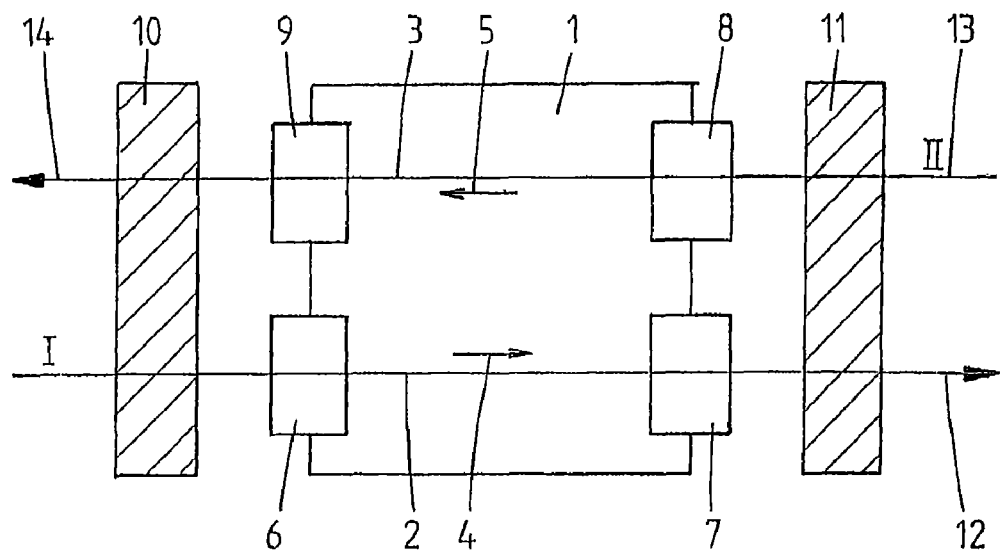
FIG. 1 shows a block diagram representation of a dewpoint cooler with a primary circuit and a secondary circuit.

The FIG. 1 shows a dewpoint cooler 1 with a primary circuit 2 and a secondary circuit 3. The media flowing therethrough are in counter-flow, as indicated with arrows 4,5. The primary medium I flows inside via an inlet 6 and is discharged via an outlet 7. Drawing of a pump, a fan or such a medium transporting means has been omitted. The secondary medium II flows in via an inlet 8 and leaves the exchanger via an outlet 9. Shown symbolically are two respective interlacing units and manifolds 10,11, which join a plurality of mutually interlaced channels within the dewpoint cooler 1 to form the respective single conduits for respectively the primary and the secondary circuit.

In the secondary circuit 3 the heat-exchanging wall is wetted by wetting means (not drawn) for the purpose of cooling this wall through evaporation of the water on the wall by the flow-by secondary airflow.

The media I, II are in heat-exchanging contact in cooler 1. In this embodiment the cooler comprises an external primary inlet 11, an external primary outlet 12, an external secondary inlet 13 and an external secondary outlet 14.

Figure 2:
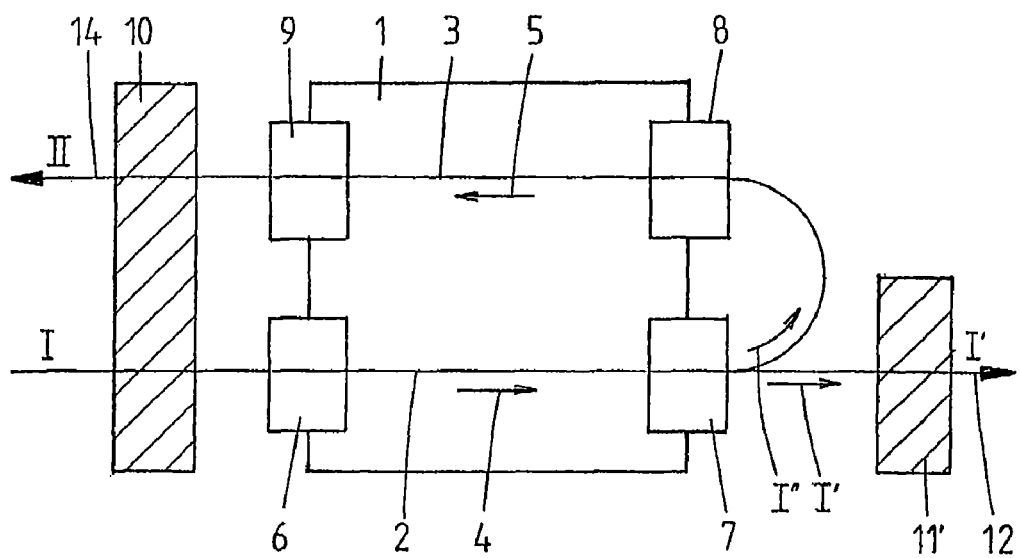
FIG. 2 shows a block diagram corresponding to FIG. 1 of a dewpoint cooler, wherein the secondary circuit connects to the outlet of the primary circuit.

FIG. 2 differs particularly in respect of this latter aspect of the embodiment according to FIG. 1 in the sense that the secondary inlet 8 of dewpoint cooler 1 receives a medium flow I", which is a branching of the total medium flow I. The through-flow I' passes via manifold 11' to outlet 12. The sum of the flow rates I' and I" is equal to I. The flow rate I" is equal to the flow rate II. The ratio between I' and I" determines the performance of the cooler to a large extent, and can for instance have a value in the order of 70:30. The medium flow I can be considered as the gross flow, i.e. the total medium flow introduced into the device. The flow I' is the thermally treated flow, in particular the cooled flow, which can be designated the net flow. The difference between gross flow I and net flow I' is the branch flow I", or II, which corresponds to flow II as according to FIG. 1. This flow II flows through the secondary circuit and in the configuration according to FIG. 2 can be designated the tare flow. The thermally treated, in particular heated medium at outlet 14 is discharged to the outside as loss.

Figure 3:
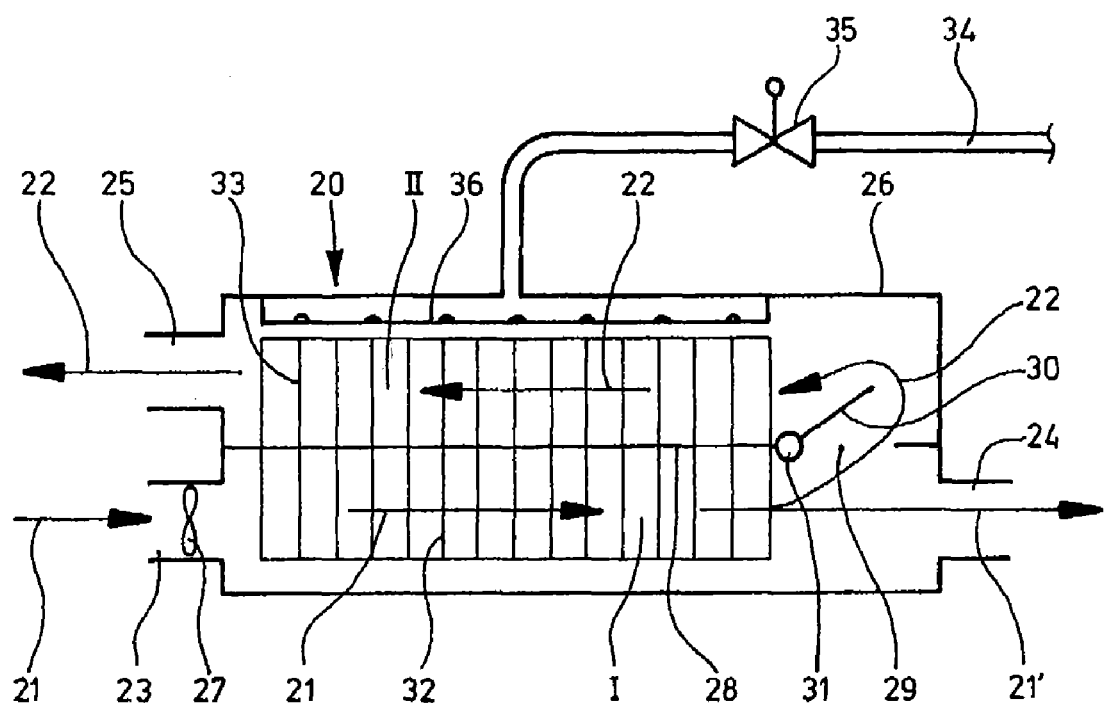
FIG. 3 shows a highly schematic example of a dewpoint cooler with a reversing unit for reversing a part of the primary medium flow.

FIG. 3 shows very schematically a dewpoint cooler 20. It comprises a primary circuit I and a secondary circuit II. A primary airflow 21 flows through the primary circuit. A secondary airflow 22 flows through the secondary circuit II. This is a branch of primary airflow 21 which itself continues as partial flow 21.

The dewpoint cooler comprises a primary inlet 23, a primary outlet 24 and a secondary outlet 25, which outlets form part of a housing 26. A fan 27 provides driving of primary airflow 21. Placed in the housing is a heat-exchanging wall 28 which separates primary circuit I from secondary circuit II. Situated in the wall is an opening 29 which can be closed and opened by means of a valve 30 which is controlled by an actuator 31.

In the drawn open position, a selected part of primary flow 21 is branched off in the form of flow 22, while the remaining part continues as flow 21'.

The wall 28 bears primary fins 32 and secondary fins 33. These serve to break up the relevant boundary layers and for effective surface area enlargement of wall 28. The secondary fins 33 are provided with a coating of Portland cement. The fins are hereby effectively hydrophilic on the surface and can buffer a determined quantity of water. This water is supplied via a water conduit 34 and a dispensing valve 35 to a dispensing conduit 36. This ensures a continuous wetting of said coating.

The flow-by secondary airflow 22 provides evaporation of the water present in the coating, this being accompanied by a cooling of fins 33, wall 28, and thereby fins 32, whereby the primary flow 21 is cooled. The primary outlet flow 21' thus has a smaller flow rate than primary flow 21, but also a reduced temperature. This flow 21' is therefore used as the effective cooled airflow for the purpose of for instance space cooling. The secondary airflow 22 entraining the water vapour can be discharged to the outside.

Not drawn is a variant in which the valve 30 is not used. The ratio between flows 21 and 22 is then not adjustable.

Figure 4:
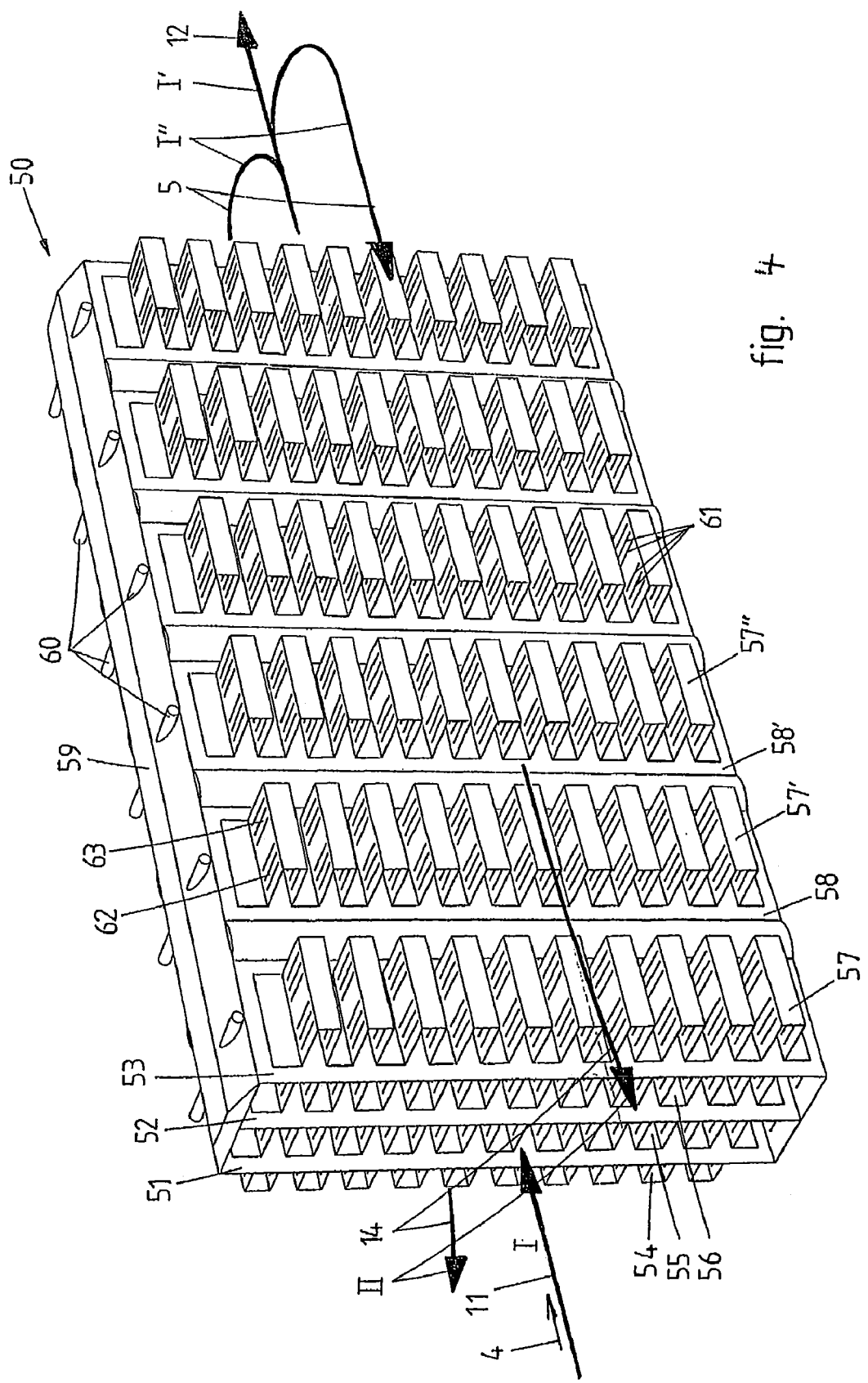
FIG. 4 shows a schematic and greatly simplified perspective view of a dewpoint cooler.

FIG. 4 shows a dewpoint cooler 50, the housing of which is omitted for the sake of clarity. In this greatly simplified view the dewpoint cooler comprises three heat-conducting and medium-separating walls 51, 52, 53, on either side of which are situated respective fins 54,55, 56,57 which extend in the form of zigzag-shaped strips in transverse direction relative to the flows to be described below. The fins have a limited length in the flow directions, while said walls 51, 52, 53 are heat-conducting in the region of the fins and have heat-insulating parts 58, 58' respectively between the respective strips of fins designated respectively 57, 57', 57". Heat transport in the longitudinal direction is hereby avoided, whereby exchanger 50 has an excellent efficiency.

The middle two of the four shown channels correspond to primary circuit I. The outer two channels, which are further bound by the housing (not shown), define secondary circuit II. The various flows and circuits are designated with the same references as in FIG. 2.

Dewpoint cooler 50 further comprises a central water supply conduit 59 with nozzles 60 for wetting the fins 54-57 which are provided with a hydrophilic coating. The fins have perforations whereby the water coming from nozzles 60 can also fully wet the fins at a lower position. Possibly surplus water is discharged by means which are not drawn. As can be seen from the figure, perforations 61 are embodied as slots. These slots are not punched out, but are formed by forming cuts in a punching machine and pressing the fin material out of the main plane of the surrounding surface such that a louvred structure results. The form of the perforations 61, now to be designated louvres, is such that they are grouped into two successive groups of louvres in flow direction, designated respectively 62 and 63. In this embodiment the group of louvres furthest upstream in the direction of flow is that with reference numeral 63. The louvres are placed such that the flow 5 is intercepted by the louvres and diverted to the other side of the fin, where the deflected flow is in turn intercepted by the louvres of group 62 and at least roughly resumes its original path. This structure provides an excellent heat transfer between the flow-by medium and the fins.

The energizing of the water supply conduit 59 with nozzles 60 for generating water on the covered side, i.e. fins 54-57 in the tare secondary medium flow II, preferably takes place intermittently. The watering system irrigates the coating whereby the fins become hydrophilic. Avoided as far as possible is direct wetting of the secondary airflow, since this only has the effect of reducing the efficiency of the dewpoint cooler. The use of sprayers according to the invention is therefore most definitely avoided. The evaporation takes place only from the coating of the fins wetted by water and the free wall parts of walls 51, 52, 53 optionally also provided with a hydrophilic coating, i.e. the fin-free zones designated 58 and 58'.

According to the invention a slight overwatering achieves that the wet wall, the fins to be also included herein, is irrigated substantially homogeneously and contains almost the same amount of water everywhere. The driving pressure difference for the evaporation is therefore optimal everywhere. A good choice of the flow speed and the degree of turbulence provide a high efficiency.

This is also the place to devote attention to the efficiency of the enthalpy-exchanger in general, in particular with reference to FIG. 4 which is clear in this respect. After passing through the primary heat-exchanging side, a part I" of the gross airflow I is carried along the secondary side of enthalpy-exchanger 50 in order to absorb water vapour in the manner described above. The heat of evaporation of the absorbed, evaporated water is used to cool the gross primary airflow I to the temperature of the net primary airflow I', which is ultimately the desired air which is blown into the relevant space for cooling. The ratio between gross flow and tare flow has an optimum at each dimensioning of the dewpoint cooler. The heat extracted from the primary gross airflow is multiplied by the thermal efficiency of dewpoint cooler 50. For the secondary extraction of enthalpy use is made largely of the latent heat of evaporation of the irrigation water. It is thereby possible to suffice with only a small airflow on the secondary side. In the typical case the ratio in mass flow between the primary flow and the secondary flow lies at a value in the order of 2 to 3.

The hydrophilic or hygroscopic covering or the surface treatments which give the fins and the fin-bearing heat-exchanging walls the required moisture-distributing and moisture-buffering properties, provide storage of the water for evaporating between two irrigation periods. The cover layer or coating is thin such that it has an almost negligible thermal resistance, whereby the heat transfer between the primary medium flow and the secondary medium flow can take place in practically undisturbed manner.

Not drawn in FIG. 4 are the manifold parts necessary for joining the outer two channels respectively the inner two channels on both sides of heat-exchanger 50. Nor are the provisions required to form the partial flows I' and I" from the flow I shown. The device according to FIG. 3 or any other suitable device can be used for this purpose.

Because a small driving temperature difference occurs in the dewpoint cooler of the type according to FIG. 4 or generally of the type according to the invention, and because the saturated vapour pressure is directly dependent on the temperature, it is very important to ensure that this temperature difference is not eliminated by longitudinal conduction (in the flow direction) in the wall. This is realized by choosing relatively small wall thicknesses, or by arranging between the fins in the flow direction of the medium separations which are non-heat-conducting or heat-conducting to only a negligible degree. These are the heat-insulating parts designated 58,58'.

So as to bring about the largest possible transport of matter on the wet side, therefore evaporating water to water vapour entrained by the secondary medium flow, the pressure difference between the vapour pressure saturated at the prevailing temperature and the vapour pressure of the supplied air must be as large as possible. Saturated air, or almost saturated air, makes this difference so small that this adversely affects the performance of the enthalpy-exchanger. The dewpoint cooler preferably has on the irrigated secondary side a partially uncovered surface, which brings the water-absorbing air further away again from the saturation point such that water can still be absorbed in optimal manner. This can be a continuous or a discontinuous process of absorbing and heating vapour.

Apart from the described thermal separation between the zones provided with fins, the heat conductivity of the intermediate wall between the primary flow and the secondary flow is not important. The heat conduction of the means which enhance heat transfer, in particular the fins, which extend some distance from the wall in the relevant channel and must therefore transport heat absorbed by conduction to the wall, is of great importance and must be well chosen. In a particular embodiment the invention in this respect makes use of fins folded in toothed or zigzag form and consisting of copper strips with louvre-like perforations as shown in FIG. 4.

What is claimed is:

1. A cooling device, comprising:
   a primary medium circuit and a secondary medium circuit thermally coupled thereto via an at least partially heat-conducting wall, through which two circuits a primary medium and a secondary medium can flow in counter-flow;
   said at least partially heat-conducting wall has heat-conducting protrusions which enlarge an effective heat-conducting surface area of said wall;
   wherein the heat conducting protrusions are configured as break-up components for breaking up at least a thermal boundary layer, a laminar boundary layer and a relative humidity boundary layer, of at least the secondary medium flowing in the secondary medium circuit and are at least partially covered at least in the secondary medium circuit with a hydrophilic coating for retaining an evaporable liquid and relinquishing it again through evaporation; and
   a wetting unit for subjecting the coating in the secondary medium circuit to wetting by the evaporable liquid.

2. Cooling device as claimed in claim 1 further comprising primary drive apparatus based on pressure difference for the primary medium.

3. Cooling device as claimed in claim 2, further comprising secondary drive apparatus based on pressure difference for the secondary medium.

4. Cooling device as claimed in claim 1, wherein the hydrophilic coating consists of a porous technical ceramic material, a cement, or a fibrous material.

5. Cooling device as claimed in claim 1, wherein the secondary medium is a partial flow which is branched off from the primary circuit and has a value of about 30% thereof.

6. Cooling device as claimed in claim 1, wherein the hydrophilic coating consists of a plastic.

7. Cooling device as claimed in claim 4, wherein the hydrophilic coating has an effective outer surface area, from which the liquid can evaporate, of at least 100×, preferably at least 1000×, larger than a projected surface area thereof.

8. Cooling device as claimed in claim 1, wherein the cooling device is dimensioned in such a way and the primary and secondary medium flows have values such that when the secondary medium flows in the secondary medium circuit it approaches its dewpoint within 1° C.

9. Cooling device comprising:
a primary medium circuit and a secondary medium circuit thermally coupled thereto via an at least partially heat-conducting wall, through which two circuits a primary medium and a secondary medium can flow in counter-flow;
said at least partially heat-conducting wall has heat-conducting protrusions which enlarge an effective heat-conducting surface area of said wall;
wherein the heat conducting protrusions are at least partially covered at least in the secondary medium circuit with a hydrophilic coating for retaining an evaporable liquid and relinquishing it again through evaporation;
and a wetting unit for subjecting the coating in the secondary medium circuit to wetting by the evaporable liquid, and
wherein the protrusions comprise fins, which fins are embodied as a number of strips, each having first and second surfaces and a general wave shape, successive wave tops of each of these strips being coupled at the first surface to the wall, and that the hydrophilic coating is substantially arranged only on the second surface of each strip which is remote from the wall.

10. Cooling device as claimed in claim 7, wherein properties of the hydrophilic coating and the evaporable liquid are chosen in relation to each other such that (a) per surface area unit of the wall and the protrusions a predetermined quantity of liquid can be buffered in the hydrophilic coating; and (b) a thermal resistance of the hydrophilic coating filled with liquid is negligible transversely of its main plane relative to a total thermal resistance in a path between the heat-conducting wall and the secondary medium.

11. Cooling device as claimed in claim 1, wherein the protrusions have mutually offset relationships.

12. Cooling device as claimed in claim 9, wherein the protrusions have a limited length in the flow direction.

13. Cooling device as claimed in claim 9, wherein the protrusions are separated in flow direction by parts with a substantially smaller thermal conduction such that a driving temperature difference of the cooling device in the flow direction is not eliminated.

14. Cooling device comprising:
a primary medium circuit and a secondary medium circuit thermally coupled thereto via an at least partially heat-conducting wall, through which two circuits a primary medium and a secondary medium can flow in counter-flow;
said at least partially heat-conducting wall has heat-conducting protrusions which enlarge an effective heat-conducting surface area of said wall;
wherein the heat conducting protrusions are at least partially covered at least in the secondary medium circuit with a hydrophilic coating for retaining an evaporable liquid and relinquishing it again through evaporation;
and a wetting unit for subjecting the coating in the secondary medium circuit to wetting by the evaporable liquid, and
wherein the protrusions comprise fins provided with louvres.

15. Cooling device as claimed in claim 14 further comprising primary drive apparatus based on pressure difference for the primary medium.

16. Cooling device as claimed in claim 14, further comprising secondary drive apparatus based on pressure difference for the secondary medium.

17. Cooling device as claimed in claim 14, wherein the hydrophilic coating consists of a porous technical ceramic material, a cement, or a fibrous material.

18. Cooling device as claimed in claim 14, wherein the secondary medium is a partial flow which is branched off from the primary circuit and has a value of about 30% thereof.

19. Cooling device as claimed in claim 14, wherein the protrusions comprise fins, which fins are embodied as a number of strips, each having first and second surfaces and a general wave shape, successive wave tops of each of these strips being coupled at the first surface to the wall, and that the hydrophilic coating is substantially arranged only on the second surface of each strip which is remote from the wall.

20. Cooling device as claimed in claim 14, wherein the at least partially heat conducting wall forms a tubular channel having the heat conducting protrusions in an interior of the channel and on an exterior of the channel, wherein the interior of the tubular channel defines the primary circuit and the secondary circuit is defined at the exterior of the tubular channel.

* * * * *